United States Patent [19]

Sanders, Jr. et al.

[11] 4,159,882
[45] Jul. 3, 1979

[54] HIGH QUALITY PRINTER

[75] Inventors: Royden C. Sanders, Jr., Wilton; Michael I. Lerer, Bedford, both of N.H.; John P. Conant, Chelmsford, Mass.

[73] Assignee: R. C. Sanders Technology Systems, Inc., Derry, N.H.

[21] Appl. No.: 811,991

[22] Filed: Jun. 30, 1977

[51] Int. Cl.$^2$ .............................................. B41J 3/12
[52] U.S. Cl. ................................. 400/124; 101/93.05; 364/900
[58] Field of Search ...................... 101/93.05; 178/30; 340/324 AD, 324 M; 364/900 MS File; 400/120, 121, 123, 124, 126

[56] References Cited

U.S. PATENT DOCUMENTS

| 3,627,096 | 12/1971 | Finnegan | 178/30 X |
|---|---|---|---|
| 3,900,094 | 8/1975 | Larsen et al. | 400/124 X |
| 3,913,719 | 10/1975 | Frey | 400/124 |
| 3,941,230 | 3/1976 | Bellino et al. | 400/124 X |
| 3,964,591 | 6/1976 | Hill et al. | 400/126 |
| 4,010,835 | 3/1977 | Martin et al. | 400/124 |
| 4,037,705 | 7/1977 | Martin et al. | 400/124 |
| 4,081,799 | 3/1978 | Granberg et al. | 340/324 AD |

FOREIGN PATENT DOCUMENTS

| 2503112 | 7/1976 | Fed. Rep. of Germany | 400/124 |
|---|---|---|---|
| 2535699 | 3/1977 | Fed. Rep. of Germany | 400/124 |
| 2633978 | 8/1977 | Fed. Rep. of Germany | 400/124 |
| 2709320 | 9/1977 | Fed. Rep. of Germany | 400/124 |

OTHER PUBLICATIONS

IBM Tech. Disc. Bulletin, J. W. Raider, "Additional Print Positions for a Matrix Printer", vol. 17, No. 12, May 1975, pp. 3560-3561.

Primary Examiner—Paul T. Sewell
Attorney, Agent, or Firm—Kenway & Jenney

[57] ABSTRACT

The printing apparatus disclosed herein generates alphanumeric characters of high quality, using a multi-pin printing head capable of forming discrete dots or pels, by controlling the actuation of the printing head with a timing resolution which is an order of magnitude finer than the nominal dot diameter so that a line smoothness for slanted or curved lines is obtained which is greater than that obtainable by a uniform matrix. The printing head is repeatedly traversed or scanned across the paper to provide essentially parallel lines of scan separated vertically by a distance which is a submultiple of the vertical spacing of the pins so that overlapping dots may be provided in the vertical dimension. By these means the apparatus facilitates the formation of smooth lines of essentially arbitrary slope or curvature.

9 Claims, 21 Drawing Figures

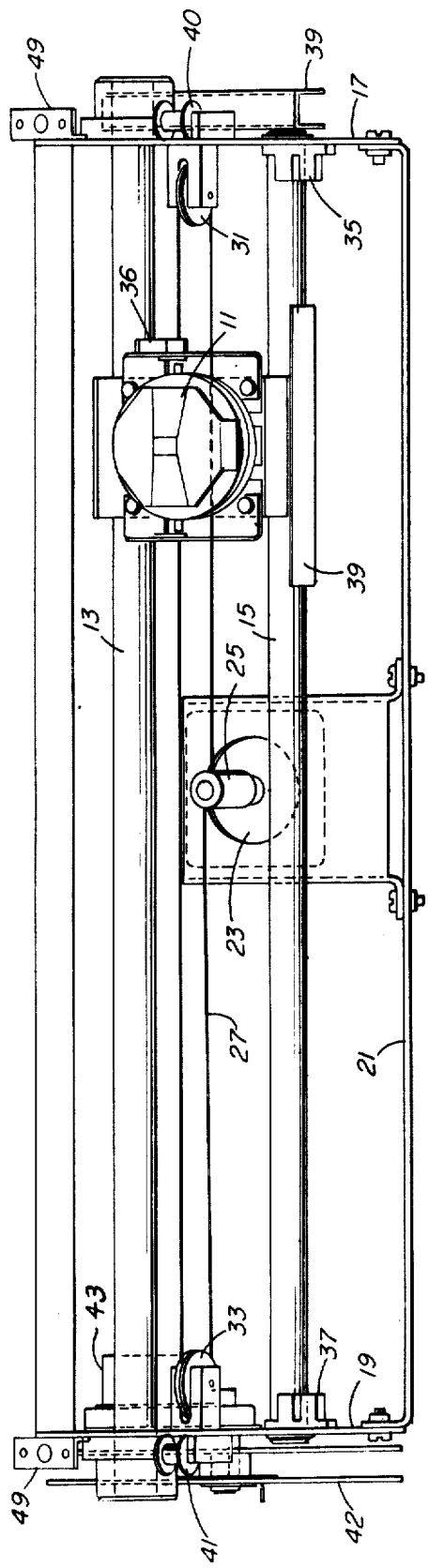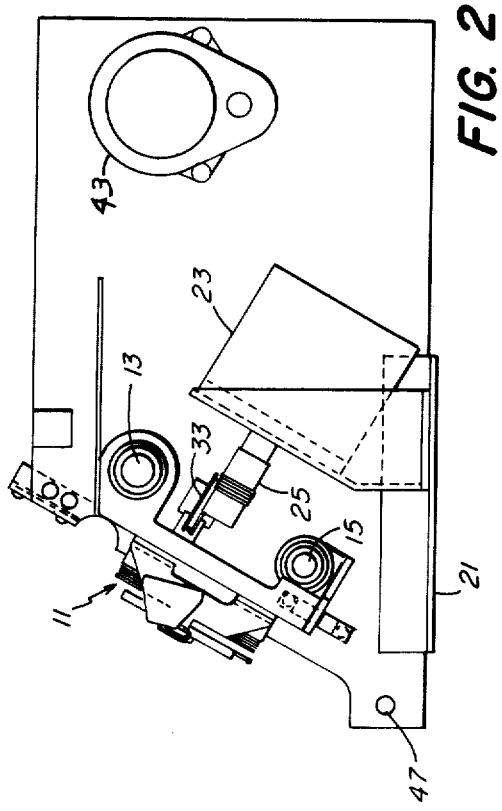

ABCDEFGHIJ
KLMNOPQRST
UVWXYZ
abcdefghij
klmnopqrst
uvwxyz
0123456789
&%@$+#¢*—=
?().∕;:"▪

FIG. 10

HIGH QUALITY PRINTER

BACKGROUND OF THE INVENTION

This invention relates to an impact printer and more particularly to such a printer capable of generating high quality line alphanumeric characters made up of discrete dots or pels.

Various types of high speed printers have been devised for generating a so-called hard copy or paper output from various data and word processing machines, e.g., high speed digital computers. Among these various types is one class of printing mechanism often referred to as a pin printer. Typically, in these devices, a print head carrying a plurality of impact pins arranged in a vertical column is traversed across the paper and the pins are actuated in an organized sequence to create recognizable characters. By and large the actuation of the pins is controlled in accordance with a uniform matrix pattern, e.g., a 5×7 matrix in which a pin strike or dot may be produced or not in any one of the 35 squares of the matrix. A 7×9 matrix providing 63 such possible strike points is also frequently used. It has also been proposed to utilize so-called half-space positions for certain dots used in various characters, e.g., as proposed in U.S. Pat. No. 3,627,096 issued Dec. 14, 1971 to Edward D. Finnegan. In the use of each of these prior art systems, however, the matrix origin of the resultant characters is manifestly palpable and the resultant product is readily identifiable as computer produced. The impression created on the observer is thus entirely distinguishable from that created by fine printing or high quality typing as such would expect from a law office. Accordingly, though impact pin printers have many inherent advantages, including low cost and high speed, such printing devices have not been acceptable in most word processing environments. Rather, various single-element printing mechanisms have predominated despite their higher cost, lower speed and greater complexity.

Among the several objects of the present invention may be noted the provision of a method and apparatus for generating high quality alphanumeric characters utilizing an impact pin printing head; the provision of such a method and apparatus which will generate curved and inclined lines with acceptably smooth edges; the provision of such a method and apparatus which will operate at high speed as compared with single-element printing devices; the provision of such apparatus which is highly reliable and which is of relatively simple and inexpensive construction. Other objects and features will be in part apparent and in part pointed out hereinafter.

SUMMARY OF THE INVENTION

Briefly, the method of the present invention employs a print head having a plurality of impact print pins positioned at different vertical heights in a mode of operation which facilitates the generation of high quality alphanumeric characters from coded data. The head is traversed across the width of the paper to be printed at a preselected speed such that any single pin can be repeatedly operated at predetermined intervals to produce overlapping dots. A bit timing signal is generated having a period which is an order of magnitude shorter than the predetermined interval related to the repetitive operation of each pin. For each traverse of the head, the data defining the alphanumeric characters is decoded, in accordance with stored information representing a character font, thereby to obtain those portions of a character-defining bit map which correspond to the lateral paths of the pin on the then current traverse. The lateral resolution of the bit map corresponds to the bit timing signal during each traverse, those portions of the bit map corresponding to the lateral paths of the pins on the current traverse are obtained from storage in synchronism with the bit timing signal and the pins are operated in accordance with the bit map information. Between successive traverses the paper is advanced vertically a distance which is a submultiple of the difference in height between successive vertically separated pin locations. Accordingly, the characters are printed by means of successive reversing traverses of the print head during which interlaced dot strings are printed with a horizontal resolution which is substantially finer than a uniform dot matrix based upon the possible repetitive operation of each pin.

BRIEF DESCRIPTION OF THE DRAWINGS

FIG. 1 is a front view, with cover removed, of the mechanical components of a printer constructed in accordance with the present invention;

FIG. 2 is a side view of the printer apparatus of FIG. 1;

FIG. 10 represents a font of high quality characters which can be formed by the apparatus of the present invention;

Corresponding reference characters indicate corresponding parts throughout the several views of the drawings.

DESCRIPTION OF THE PREFERRED EMBODIMENT

Figure 3:
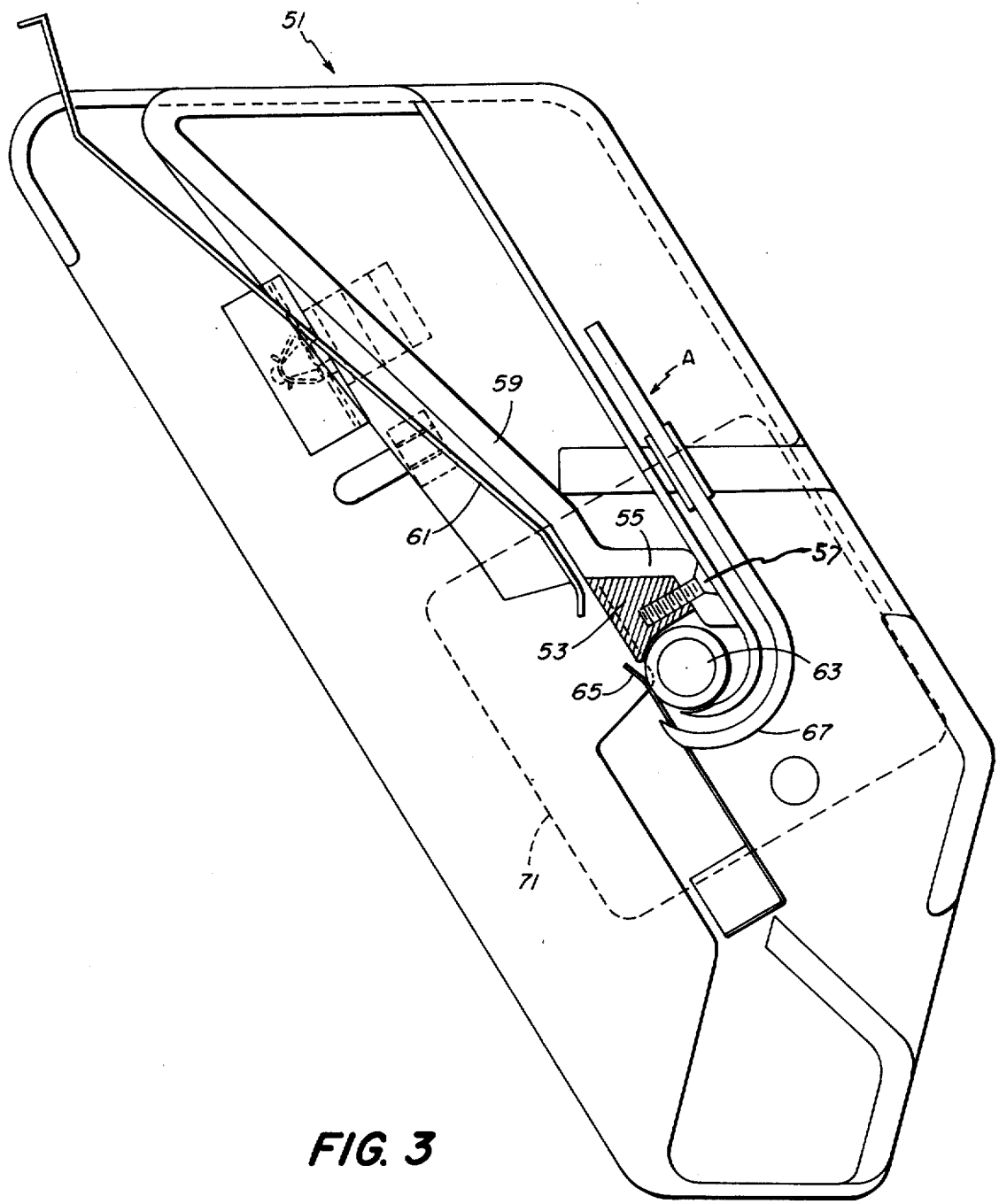
FIG. 3 is a sectional view of a cover with paper sheet mechanism employed with the apparatus of FIG. 1.

An advantage of the method and system of the present invention is that it permits the printing to be accomplished by means of a mechanism which comprises relatively few mechanical or moving components and is therefore inherently highly reliable. Referring now to FIGS. 1 and 2, a seven pin impact print head is indicated at reference character 11. In the particular embodiment illustrated, the print head shown is a model manufactured by the Practical Automation Corporation of Shelton, Connecticut. This print head provides seven impact pins disposed in a vertical or columnar array, each pin being provided with a respective actuating winding.

Print head 11 is slidably supported on a pair of cylindrical ways 13 and 15 so that it can be traversed from side to side. The ways 13 and 15 are themselves mounted on the side plates 17 and 19 of the printer frame, these side plates being linked also by a base plate 21 as shown. Movement of the print head 11 along the ways is controlled by means of a stepping motor 23 mounted on the base plate 21. Motor 23 drives a helically grooved capstan 25 about which is wrapped a drive cable 27. The portions of the drive cable coming off the top of capstan 25 pass around sheaves 31 and 33 carried on the end plates 17 and 19 and are then connected to the print head. Sufficient tension is placed on drive cable 27 so that movement of the print head 11 is precisely responsive to rotation of the shaft of stepping motor 23.

Optoelectronic interrupter modules 35 and 37 are mounted on the end plates 17 and 19 and the print head carries an interrupter blade 39 which cooperates with these modules to provide logic signals when the print head 11 approaches the limit of its possible travel in either direction along ways 13 and 15. These signals are designated HEAD RIGHT and HEAD LEFT and are utilized by the printer control circuitry described in greater detail hereinafter.

As will be pointed out in greater detail hereinafter, the traversing of the print head along the ways under the control of the stepping motor 23 is conducted on an open-loop basis. This may be contrasted with the closed-loop servo control systems employed in most prior art devices, i.e., in which position is continuously referenced or sensed by means of a position encoder or a so-called optical fence. In the system of the present head, position is ascertained initially by running the head to one end or the other so that the blade 39 actuates the respective optoelectronic interrupter module. Thereafter, however, the energization of the stepping motor is under programmatic control in accordance with the present invention in such a manner as to obtain higher resolution than can practically be obtained with optical fence systems.

As may be seen, the print head 11 is oriented so that the impact ends of the pins face the viewer looking at FIG. 1. The paper on which the printing is to take place is then held over the print head as considered from the viewpoint of FIG. 1. The head 11 carries with it an optoelectronic sensor 36 which senses the presence of paper in front of the head and which generates a logic signal designated PAPER. The paper is fed to and held in the appropriate position by means of the cover mechanism which is described hereinafter with reference to FIG. 3. A multi-strike carbon film type ribbon is interposed between the print head and the paper in essentially conventional fashion. The ribbon is taken off from a feed reel as indicated at 39, passed over a turning roller 40 so as to be aligned with the face of the print head 11. From the print head it then passes over another turning roller 41 at the opposite end of the housing and thence over an idler roller and onto a take-up reel 42. Reel 42 is driven by a clock motor 43 whose energization is controlled to maintain a proper rate of ribbon feed for the amount of printing taking place. The idler roller preferably carries with it an optical chopping disk which cooperates with another opto-electronic interrupter module for generating a logic signal indicative of ribbon travel. This signal is designated RIBBON and is utilized by the microprocessor or controller described hereinafter in controlling the ribbon feed to provide proper advancement despite a changing effective radius of the take-up reel 42. The feed reel 39 is provided with a suitable friction brake (not shown) to maintain an appropriate degree of tension on the print ribbon.

The front door or cover incorporating the paper feed is pivotally mounted on the printer frame by means of hinge pins located as indicated at 47 in FIG. 2 so that the cover may be rocked forward and down to obtain access to the print head 11 and ribbon path. Retaining clips 49 are provided for holding the cover in operative position. The cover, designated generally by reference character 51, is preferably constructed as a unitary plastic resin casting, utilizing a casting compound of high dimensional stability. FIG. 3 is a side or sectional view of such a cover, the view being from the left hand side when referenced to the orientation shown in FIG. 1.

A plastic or metal platen 53 is mounted against a web 55 of the cover casting by means of screws 57. As will be understood, the platen 53 provides the surface against which the impact pins of the print head 11 operate in creating an impression on the paper. In the embodiment illustrated, cut paper is fed into the printer from the top, being led to the platen 53 along a pathway defined between a casting web 59 and a formed sheet metal guide 61. A feed roller 63 is journaled just below the platen 53 and a succession of leaf springs 65 are positioned to hold a piece of paper so fed against the roller 63. The roller 63 is rubber-coated, as indicated, to provide adequate friction, but the rubber coating is held to the minimum practical thickness so that positioning errors associated with advancing and retracting a sheet of paper are minimized and so that positional reproducibility is enhanced.

A guide 67 is positioned so as to turn a sheet of paper emerging from being advanced past the feed roll 63 into an upwardly rising path, as illustrated. Preferably the guide 67 is constructed of a transparent material so that when printed text has advanced to a point, this point being designated by reference character A, where it is clear of the cover shell, any printed text can be read from the front of the machine. While printing upside down on the back side of a piece of paper may not seem intuitive at first glance, it will be appreciated by an overall consideration of the machine that a very compact structure is achieved which provides easy access to all working parts of the mechanism.

The drive roller 63 is directly actuated by a stepping motor 71. This stepping motor is mounted on the right hand side of the cover casting. As with the stepping motor which traverses the print head, the stepping motor 71 which controls the paper feed is likewise operated in an open-loop mode to effect high resolution and highly accurate positioning of the paper.

Figure 5:
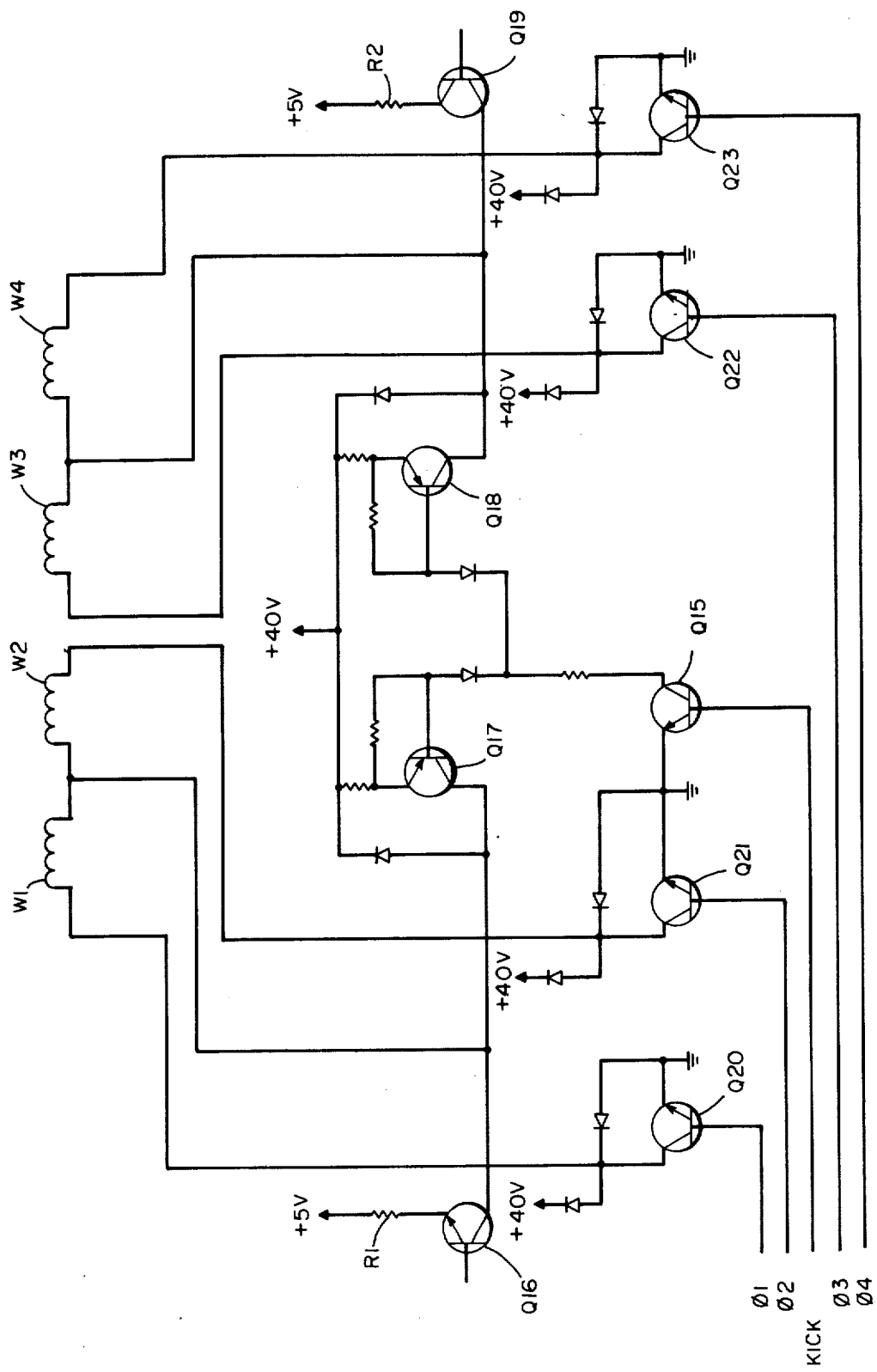
FIG. 5 is a schematic circuit diagram of stepper motor drive circuitry employed with the apparatus of FIG. 1.
Figure 6:
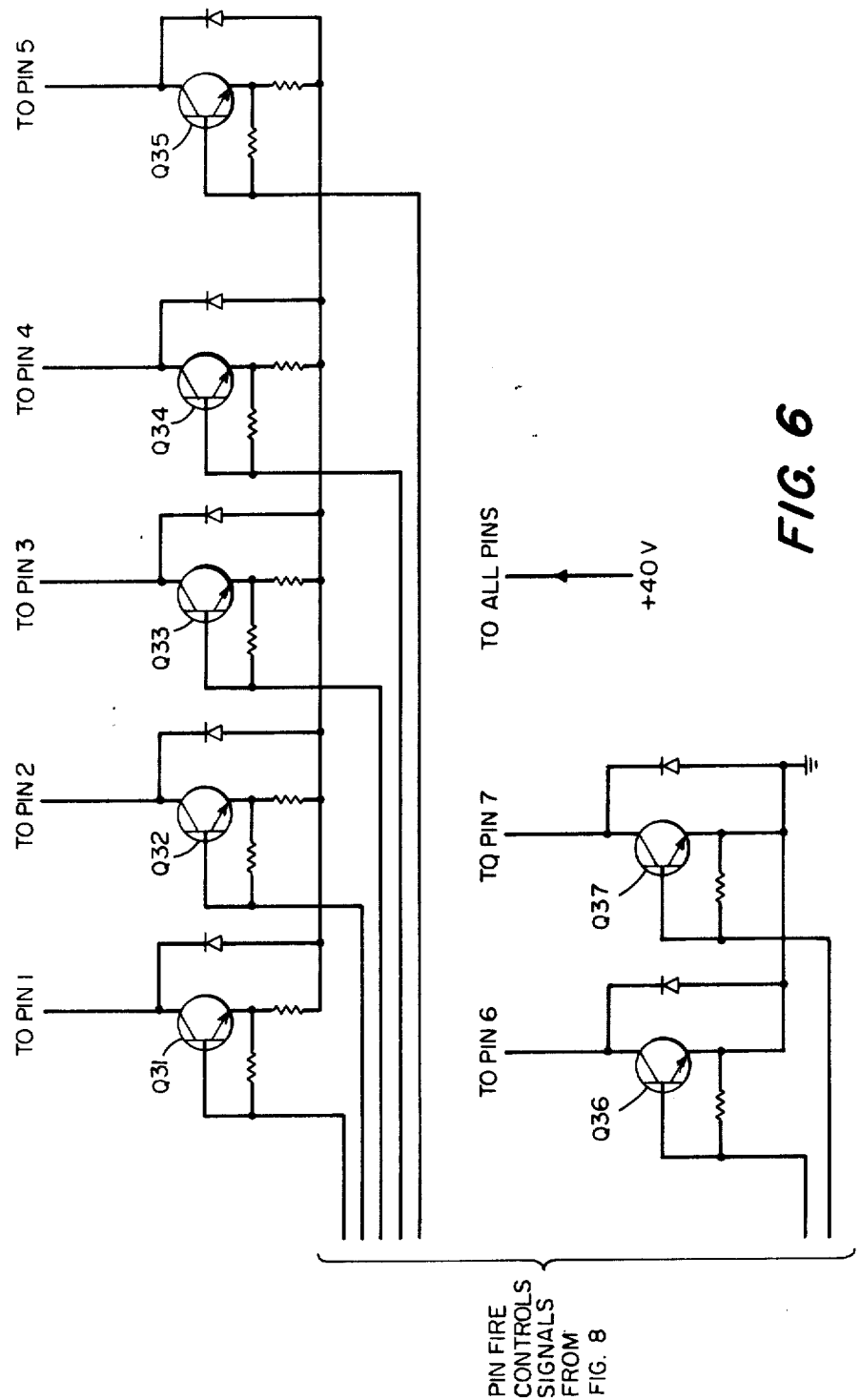
FIG. 6 is a schematic circuit diagram of print head pin driving electronics employed with the apparatus of FIG. 1.

The power circuitry for driving each of the stepping motors is shown in FIG. 5, identical circuitry being used for energizing the two stepping motors 23 and 71. Each stepping motor has four windings, designated in this drawing as W1-W4, pairs of windings being connected to common positive supply terminals shown in the drawing somewhat as a center tap between each pair of windings.

Continuous energization of the windings between phase transitions is provided from a 5 volt supply and current from such a source is applied to the supply terminals to respective transistors Q16 and Q19 which are operated as diodes. In order to speed the response time of the stepping motors, however, a momentary high-voltage pulse is briefly applied at each phase transition to overcome the inductance of the winding being energized and to speed the application of full energizing current. This initial pulse is referred to herein as a KICK pulse and is derived from a 40 volt supply. Current from this supply can be selectively applied to the two supply lines through respective switching transistors Q17 and Q18. These transistors can selectively be turned on simultaneously by means of an NPN transistor Q15 which operates as a level shifter and control switch.

The individual winding energization control transistors are indicated at Q20-Q23. The various protective diodes and current limiting transistors which are normally used in conjunction with stepping motor energizing circuits are not described in detail hereinafter since it is believed that their function will be apparent to those skilled in the art.

As is understood, the several windings of the stepping motor are conventionally energized in an overlapping phase sequence to effect a controlled rotation of the motor shaft. In the present embodiment, the sequence is one in which two windings are energized at all times, the selection of windings being shifted to effect the rotation. Each change in winding energization state is considered a phase transition. By means of circuitry described in greater detail hereinafter, a 50 microsecond KICK pulse is applied to turn on transistor Q15 and thus turn on transistors Q17 and Q18. It can thus be seen that, at each phase transition, the winding which is just being turned on will receive a brief high-voltage pulse. This initial high-voltage pulse will cause the current in the newly energized winding to rise relatively quickly toward the desired final level. After this 50 microsecond period, however, the desired current level is then maintained from the 5 volts supply in conventional manner.

Figure 7:
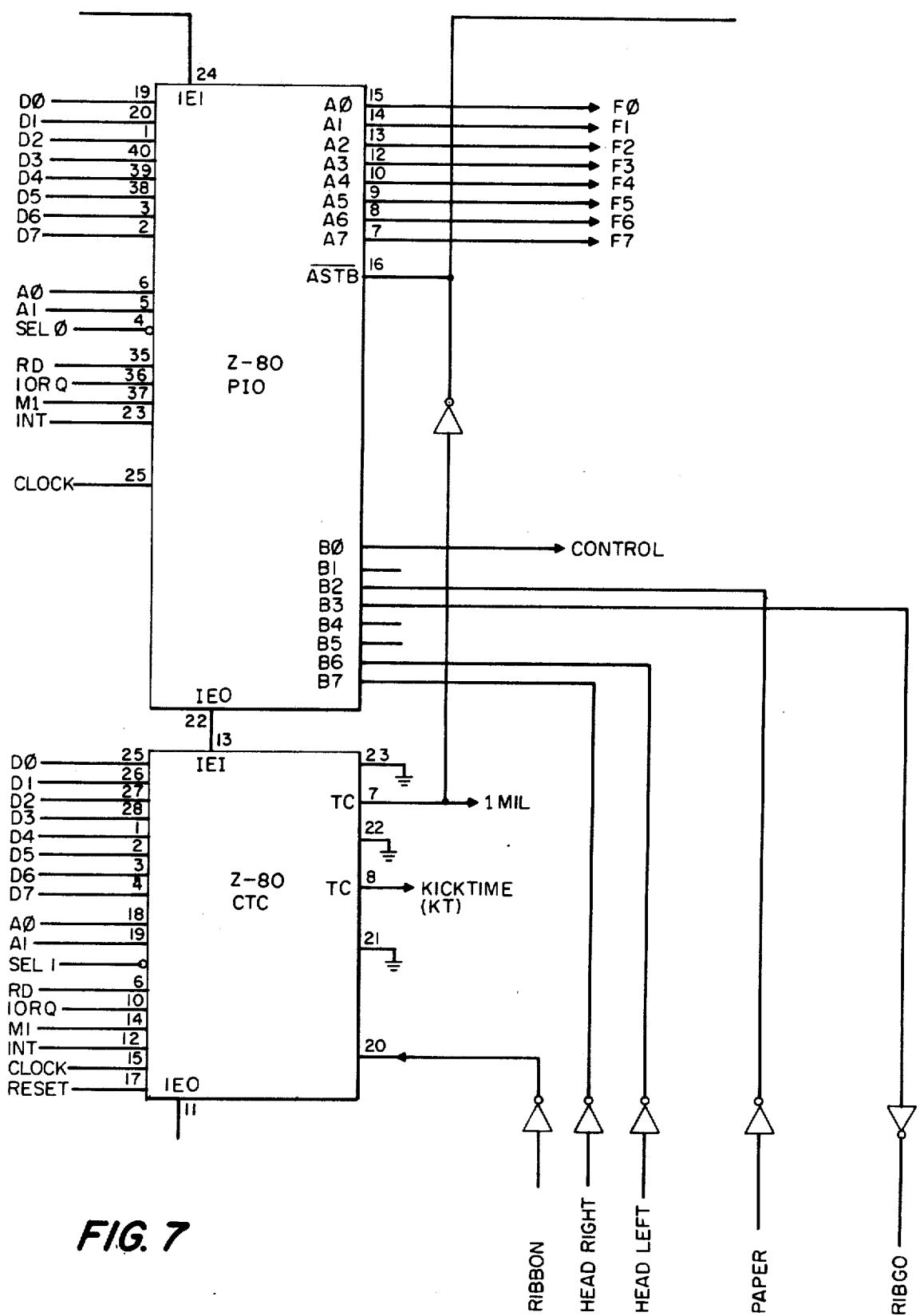
FIG. 7 is a detailed circuit diagram of parallel input-/output circuitry and programmable timer circuitry included in the microprocessor controller of FIG. 4.

The pin fire driving circuitry is diagrammed in FIG. 7. Each pin winding is driven essentially be a straightforward transistor current switch Q31-Q37 from the common 40 volt supply. No two-level energizing scheme is applied for the pin drivers, but, as is explained in greater detail hereinafter, the timing of pin winding energization is controlled in accordance with a preselected algorithm to effect fast repetitive operation and to dampen pin oscillation after completion of a strike which is not immediately followed by another strike.

Before describing in detail the circuitry which controls the operation of the electromechanical components thus far described, it may be useful to describe in general terms the overall operating method of this system with reference to a particular or exemplary mode of operation. The system of the present invention can, while operating in a four-pass mode, generate characters of a quality which is comparable to the quality obtained from a modern electric typewriter, while at the same time permitting the use of more than one type font.

Unlike the single-element impact printing mode of conventional typewriting, the printer of the present invention constructs each character from a multiplicity of dots or pels. Unlike conventional dot matrix printers, however, the positioning of the dots along the horizontal axis by the present system is essentially arbitrary to within a very high degree of resolution, i.e. a resolution which is an order of magnitude finer than the size of the dots or pels which make up the image. Further, by making several passes over the same line of print with the paper being moved vertically between passes a distance which is related to a submultiple of the vertical pin separation, an increased vertical resolution is also obtained. While this vertical resolution is much more limited or finite and does not allow the essentially arbitrary positioning of dots which is permitted in the horizontal direction, it has been found that the availability of essentially arbitrary placement in the horizontal direction renders unnecessary any need for an equivalent vertical resolution and yet high quality characters having curved and slanted line elements may be accurately generated.

While the development of type fonts for use in connection with the present printing system is now without some constraint, quite a range of flexibility is available as is evidenced by the type font which is reproduced in FIG. 10. This font, as well as others, may be generated by the illustrated embodiment of the present invention operating in a four-pass mode.

As will be understood by those skilled in the pin printing art, there is a finite minimum time between possible successive operations of any one of the pins in the print head 11. For the Practical Automation print head identified previously, successive operations of any one pin may be reliably scheduled at intervals of 0.720 milliseconds. In order to print horizontal lines having acceptable smoothness, i.e. essentially indiscernible granularity, the print head is traversed at a rate such that a single pin can be repetitively operated and produce successive dots with a substantial overlap. Assuming, as is representative, that each dot will have a nominal diameter in the order of 10 mils, an appropriate lateral slew speed for the head traverse is about 12 inches per second giving a spacing on centers of 8 mils.

While successive operations at 8 mil lateral separations will produce a horizontal line of acceptable smoothness or lack of granularity, essentially arbitrary lateral positioning resolution is provided in accordance with the present invention in order to facilitate the formation of slanted and pleasingly curved lines. In order to permit such essentially arbitrarily lateral placement of dots, a relatively high frequency bit map timing signal is generated in the circuitry described hereinafter. This bit map timing signal has a period which, for the selected slew speed of the head, corresponds to a lateral placement resolution which is an order of magnitude finer than the nominal diameter of the dot. For the particular embodiment illustrated, the bit timing signal has a period of 90 microseconds when the head is moving at full slew speed and this time interval thus corresponds to a 1 mil lateral movement of the print head 11 at a speed of 12 inches per second. Given a nominal dot diameter of 10 mils, the order-of-magnitude relationship is clear. It should be understood, however, that this relationship need not be exactly precise. The important point is only that the lateral resolution of dot placement be much finer, by approximately an order-of-magnitude, than the nominal diameter of the dots. The period of the bit map timing signal can also be understood as being a submultiple of the restrike period of any given pin. While it is conceptually useful to relate the bit map timing signal to the minimum restrike time or to the nominal dot diameter, it may, in actual implementation, be useful to digitally relate this timing signal to the clock frequency which controls the traversing stepping motor 23.

In the context of a character which is in size comparable to a normal typewritten character, i.e. a character fitting within a space 80 mils × 120 mils, it will be understood that lateral resolution in the order of 1 mil means that a given dot may be positioned essentially arbitrarily along any given scan line, even though a second dot on that same scan line could not be formed except after another 8 mil movement of the print head. The latter constraint, however, is not a serious one as evidenced by the character font of FIG. 10 which is made possible by the highly accurate dot placement provided by the present invention. Essentially, in laying out each font, the designer can form a line character and then place a dot wherever a scan line crosses the character line. Arbitrarily curved lines can be pleasingly formed since the lateral placement of dots is not constrained to a regular uniform rectilinear matrix. Rather, each dot positioned can be adjusted laterally until it falls essentially directly on the desired character line path. Purely horizontal lines can be satisfactorily formed in that the restrike time of each pin allows sufficient overlap to avoid troublesome granularity. Likewise, the dots forming a vertical line can be formed with sufficient overlap since the apparatus provides repetitive traversing of the paper with the paper being advanced vertically between traverses in steps which are related to a submultiple of the vertical spacing between vertically adjacent pins in the print head.

Figure 4:
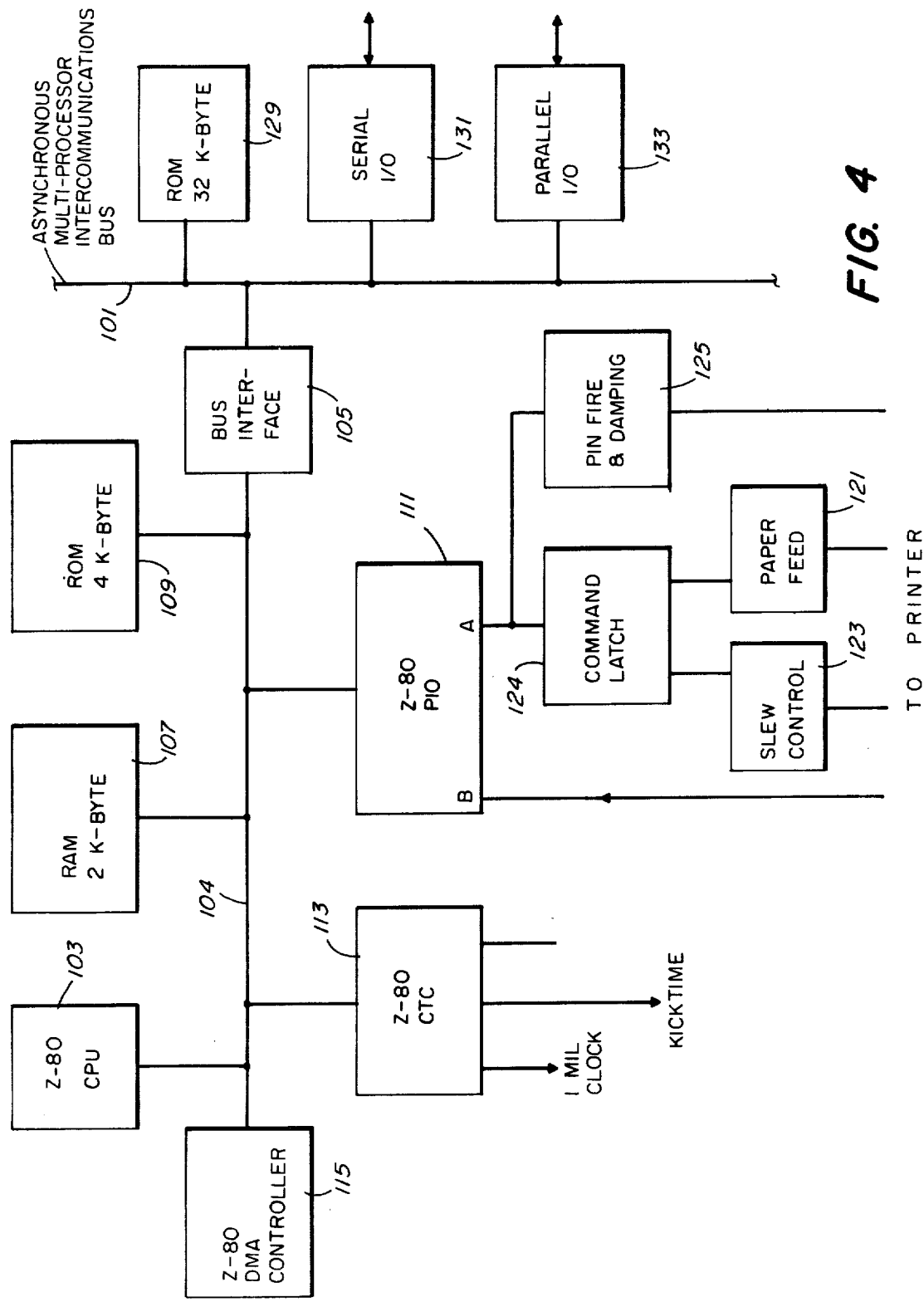
FIG. 4 is a block diagram of a microprocessor controller system employed with the apparatus of FIG. 1 in accordance with the practice of the present invention.
Figure 11B:
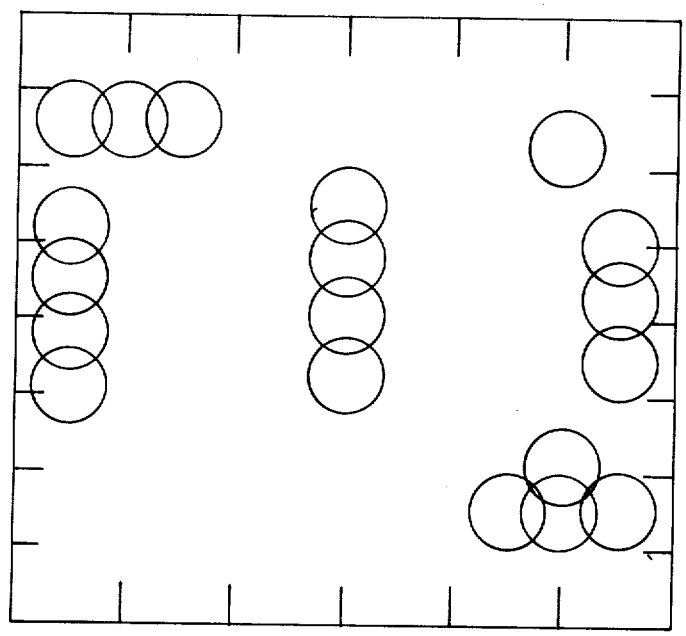
FIGS. 11a–d illustrate the formation of one of the FIG. 10 font characters during sequential passes or traverses of the print head of the FIG. 1 apparatus.
Figure 11A:
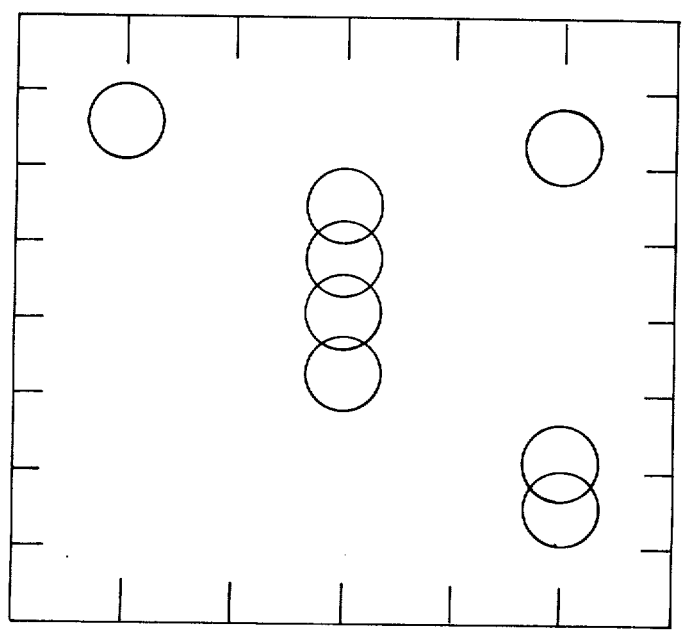
Figure 11D:
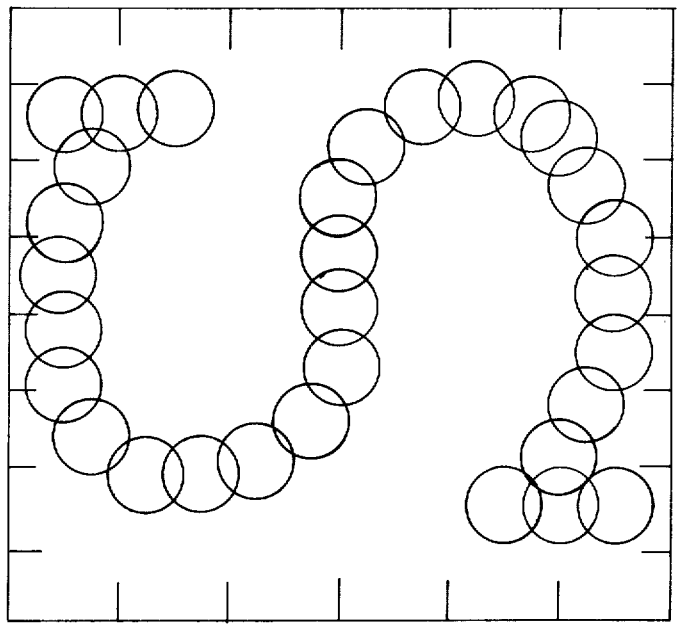
Figure 11C:
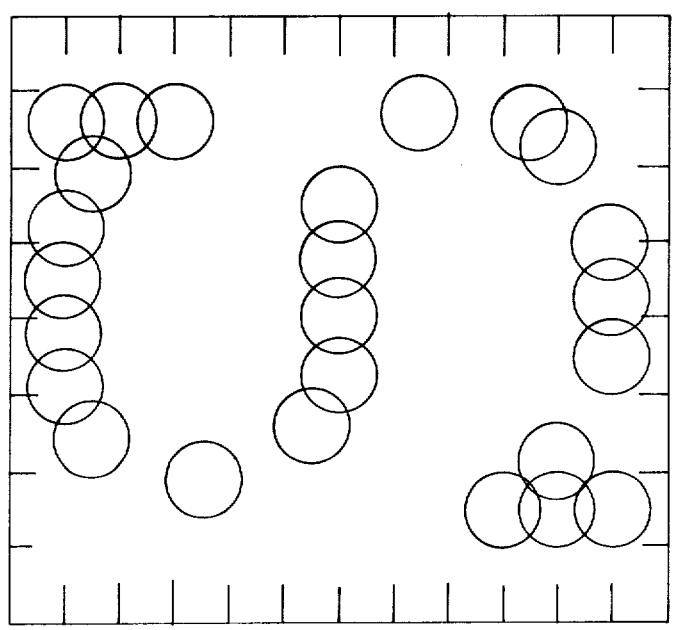

FIGS. 11a–11d illustrate the detailed formation of the letter "S" from the font of FIG. 10. FIG. 11a shows the dots or pels which are formed during the first traverse or pass of the head. FIG. 11b shows the dots present after the first and second traverses of the head. FIG. 11c shows the accumulation after three passes while FIG. 11d shows the resultant completed character after four passes. As indicated previously, the paper is advanced by the stepping motor 71 between each traverse of the head so that the paths followed by the pins on each successive traverse interlace with the paths followed on the previous traverses. There being four passes, the smallest increment of vertical travel is thus chosen to be one quarter of the vertical separation between pins in the head, i.e. 3½ mils in the example illustrated. It has been found advantageous in laying out type fonts, however, that the advances between passes be mainly in multiples of that smallest increment to slightly increase the total possible height of the character. Thus, in the presently preferred mode of operation of the printer, the paper is advanced seven mils after the first traverse. After the second traverse, the paper is advanced 3½ mils and after the third traverse, the paper is again advanced seven mils. While this pattern does not give maximum vertical resolution at the very top and very bottom of the total character line height, it does allow greater flexibility in providing for quotation marks, apostrophes and depending "tails" such as are present on the letters q, g, and y. In the embodiment illustrated, a microprocessor is utilized to control the traversing of the print head by the stepping motor 23, the advancement of the paper by the stepping motor 71, and the conversion of conventionally encoded alphanumeric data, e.g. ASCII code, to a bit map format appropriate for sequential presentation to the pindriving circuitry. FIG. 4 is a block diagram illustrating the overall organization of the computer system, while FIGS. 5–9 are more detailed schematic circuit diagrams representing the circuitry constituting respective portions of the system illustrated in FIG. 4.

Referring now to FIG. 4, the overall system illustrated there is organized around an asynchronous multiprocessor-type intercommunications bus, indicated generally by reference character 101. The use of this type of bus structure, itself known in the art, facilitates the incorporation of the printer of the present invention into an overall word processing system or in coupling the printer to other computer systems. The CPU or microprocessor itself is indicated by reference character 103 and is interconnected with a local bus 104 which is connected to the main bus 101 through interface circuitry 105. The particular microprocessor employed with the preferred embodiment being described is the Z80 microprocessor manufactured by Zilog Company of Cupertino, California, and the various bus, timing and interface systems cooperating with the processor have been implemented with components available from the same company and conforming to the published standards which have been established for use with systems utilizing that processor.

Directly associated with the processor 103 is 2 kilobytes of random access memory (RAM) 107 and 4 kilobytes of read-only memory (ROM) 109. This latter memory space is utilized for the operating system program. Likewise directly associated with the processor, and preferably on the same circuit card therewith, are a parallel input-output interface system 111, a programmable timing circuit 113, and a direct memory access controller 115. The timing circuitry 113 serves to generate various clock or timing signals. The direct memory access controller 115 facilitates transfers of data between the system memory and components of the system other than the main processor unit 103. The parallel input-output circuitry 111 permits the computer system to address and provide data control signals to the electromechanical hardware described previously and to sense various conditions or occurrences in that equipment.

Among the subsystems which are controlled through the parallel input-output circuitry 111 are the paper feed control, designated generally by reference character 121, and the slew control 123 which is the circuitry which directly drives the traversing stepping motor 23. Command signals to these components are held in a command latch 124. The parallel input-output circuitry 111 also controls the pin firings through circuitry designated by reference character 125. This latter circuitry implements a particular energization sequence to effect pin recoil damping, as described hereinafter.

The communications bus 101 also provides communication with a larger read-only memory (ROM) 129, i.e. one comprising 32 kilobytes of stored data. As described in greater detail hereinafter, this memory is utilized to store the data which defines the different character fonts for the system. Bus 101 also provides communications with a serial input-output device and a parallel input-output device 133. These input-output devices are set up for alternate utilization and provide a means through which the system can receive encoded alphanumeric data from devices outside of the printing system itself, e.g. a word-processing system with which the printer of the present invention might be used as the hard copy output device. As is understood, parallel inputs are used in connection with certain computer type interfaces whereas serial data coupling may be required for use with teletype oriented systems or those conforming to the standard designated RS 232.

As will be understood by those skilled in the art, the apparatus of FIG. 4 constitutes, except for the command latch, traverse and line feed controls, and the pin fire driving circuitry, an essentially generalized microcomputer controller system. The several functions of the microprocessor controller in the overall printing system are as follows. Firstly, the controller, together with its associated memory, receives and buffers alphanumeric data received through the serial input-output interface 131 or the parallel input-output interface 133. Secondly, upon receiving alphanumeric data which is to be printed, the controller initiates and sequences successive traverses of the print head 11 across the width of the paper and provides also incremental advance of the paper between traverses so as to produce multiple but vertically incremented scans over each line of print. The controller also effects line feeds between successive lines of printing. Finally, as the print head is being traversed, the controller takes the coded alphanumeric data from the appropriate location in its buffer memory and translates that data into bit map information appropriate for controlling the operation of the individual print head impact pins on the current traverse.

Rather than being directly applied by the microprocessor to the pin driving circuitry, the bit map information for each traverse is stored in another portion of the random access memory 107 which portion of the memory is operated as a circular buffer, that is, somewhat in the nature of a first in/first out storage register. The parallel input/output circuit 111 is then allowed to take bit map data out of this portion of memory directly utilizing the direct memory access (DMA) capablities provided by the controller 115. This regular taking of information from the circular register portion of memory 107 is initiated under the control of the bit map timing signal whose function was described previously.

Figure 8:
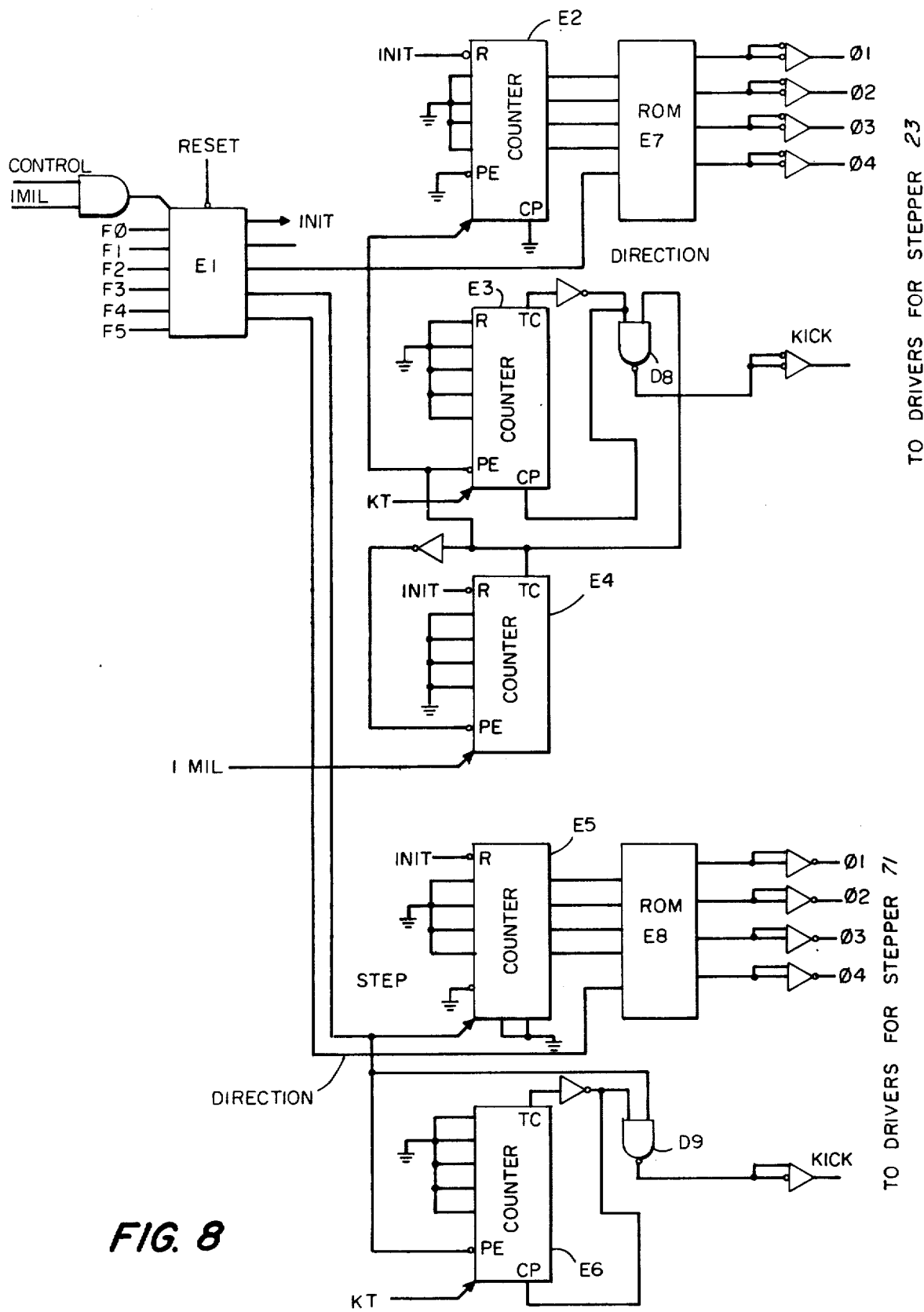
FIG. 8 is a schematic circuit diagram of stepping motor logic control circuitry employed for interfacing the microprocessor control system of FIG. 4 to the stepping motor's drivers employed with the mechanical components of the system.
Figure 9:
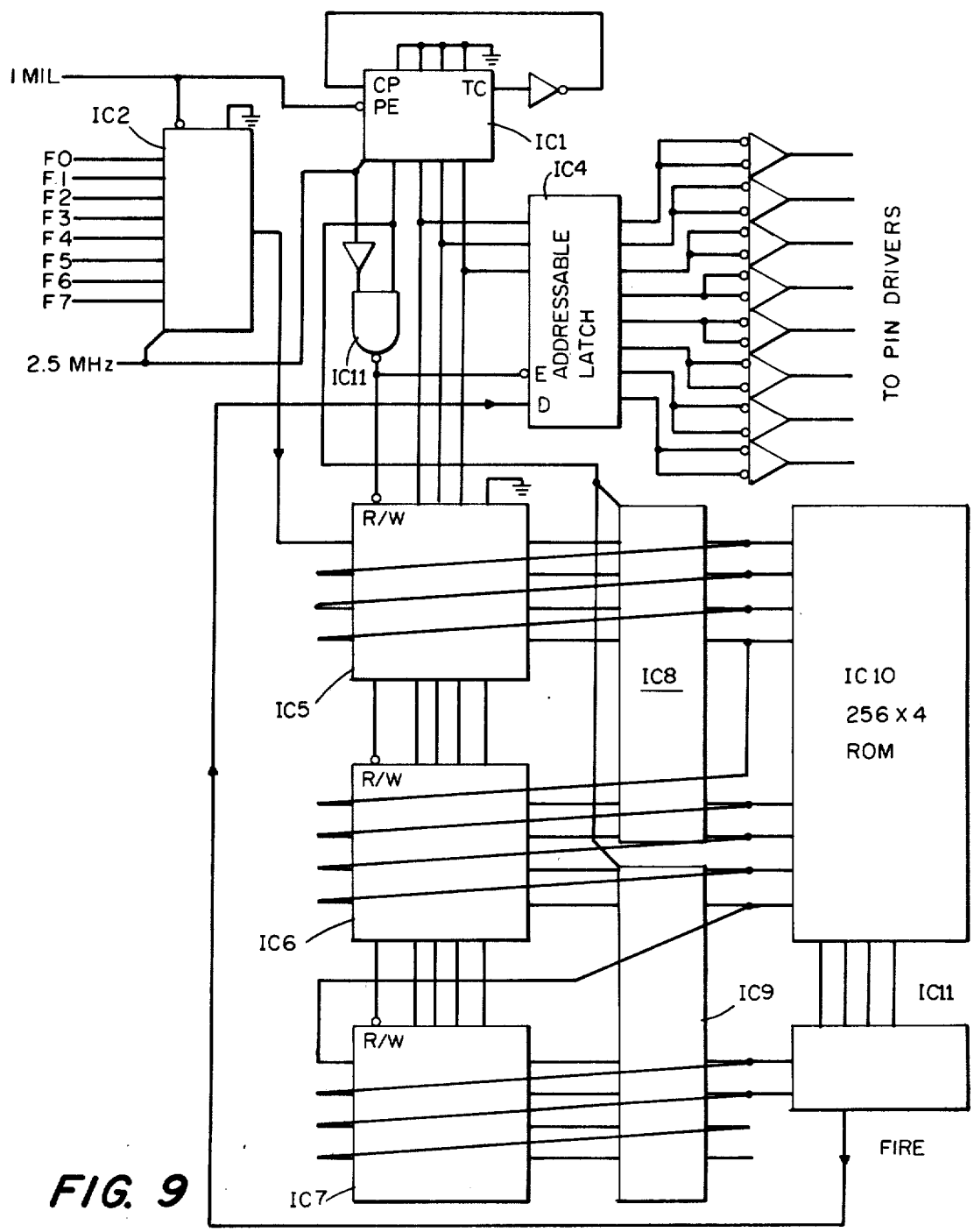
FIG. 9 is a schematic circuit diagram of logic circuitry controlling the energizing waveform for driving the print head under the control of the microprocessor system of FIG. 4.

The printer control logic, i.e. that portion of the FIG. 4 system which is more specially tailored or dedicated to the printer control, is shown in FIGS. 7-9. The interconnections to the parallel input/output circuitry 111 and the programmable timing module 113 are shown in FIG. 7. For signals which are coupled back into the more generalized portion of FIG. 4 microprocessor system, signal designations have been applied which are consistent with those conventionally used when employing the Zilog Z80 family of integrated circuit components. Signals interfacing with the printer control electronics have been given similar mnemonic designations which can be matched with the corresponding signal designations in FIGS. 8 and 9 which in turn directly feed the power circuitry for the stepping motors and pin windings, these being illustrated in FIGS. 5 and 6. FIG. 8 comprises the line feed control 121 which controls the energization of the paper feed stepping motor 71; the traverse control circuitry 123 which controls the energization of the head traversing stepping motor 23, and the command latch 124 which buffers signals transmitted from the I/O circuitry 111. FIG. 9 comprises the circuitry which controls the energization of the individual pin fire windings in accordance with a stored algorithm which effects damping of pin oscillators.

The Zilog input-output circuit 111 referenced previously is a bidirectional device and is employed for sensing various conditions in the printer as well as controlling the pin firings and the stepping motors. Sensing is accomplished through the B port of this device and among the signals sensed are the ribbon advance signal RIBBON, the left and right head travel limit signals, HEAD RIGHT and HEAD LEFT, and the signal from the paper edge sensor on the head, PAPER, the optoelectronic devices which provide these signals having been described with reference to the mechanical construction of the printer itself. This port also provides for controlling the advance of the ribbon. This latter signal is designated RIBGO and it effects the energization of the ribbon feed clock motor 43 for the ribbon through a solid state relay or reed switch (not shown) which controls the a.c. energization of that motor.

The bit map timing signal 1 MIL, in addition to the defining the resolution of possible pin strike locations, is also used in controlling the operation of the head traversing stepping motor 23 so that the correspondence between head position and bit map decoding remains predictable.

As will be appreciated, the slew velocity of the print head cannot be instantaneously reversed at the end of each traverse but rather the head must be decelerated and accelerated over some finite time interval. To allow controlled acceleration or ramping of the head velocity, the actual generation of the bit map timing signal is controlled and adjusted under programmatic control. Thus, in decelerating the head, the actual period of the bit map timing signal is gradually stretched out and then shortened again after the stepping motor direction has been reversed. The actual sequence of timing intervals necessary will, of course, depend upon the particular stepping motor used and the inertia and stiffness of the various mechanical components. Thus, the sequence or program is preferably determined empirically to achieve the quickest turn-around with the minimal residual vibration. The generation of a timing signal having an adjustable or programmable period is greatly facilitated by the availability of the Zilog integrated circuit timing module, designated CTC, which incorporates not only the necessary frequency dividers but also registers for holding values determining the selected timing parameters. In the drawings, the bit map timing signal is designated as the 1 MIL signal throughout since, even though the period of this signal may be varied under programmatic control, each cycle still corresponds to 1 mil travel of the print head.

As indicated previously, the slew control and vertical feed control circuitry are directed through a data or command latch which is loaded from the parallel input-output circuitry 111. In FIG. 8 this latch is indicated at E1. The parallel data inputs F0–F5 and the CONTROL signal are obtained from the parallel input-output circuitry 111 as indicated in FIG. 7. The enabling signal for this latch is derived from a signal designated CONTROL, also obtained from the PIO 111, together with the 1 MIL timing signal, described previously. As indicated previously, the 1 mil resolution provided for dot placement is substantially finer than the resolution which is practically obtainable by individual phase transitions in driving the stepping motor 23. Accordingly, the 1 MIL signal is first divided down by a counter E4 which effects a factor-of-16 division. Counter E4 is an LS 161 integrated circuit as are the other four counters E2, E3, E5 and E6 shown in this circuit. An output signal is taken from TC (terminal count) output of the counter. This output signal goes high to indicate an all ones state of the counter. The TC signal from counter E4 clocks the counter E2. The four output signals form the counter E2 are decoded by a read-only memory E7 to generate the individual phase control signals overlapping in time which are appropriate for driving the stepping motor 23 in accordance with conventional practice. These signals are applied, through buffer gates as indicated, to driver circuitry for the stepping motor 23, e.g. circuitry as shown in FIG. 5. Direction is controlled by means of a fifth address line into the read-only memory E7, the direction signal being also obtained from the command latch E1.

In addition to clocking the counter E2, the TC signal from counter E4 also initiates the generation of the KICK pulses which speed the response of the stepping motor. When the TC output signal from counter E4 goes high, it enables a NAND gate D8 which causes the initiation of a KICK pulse. This same signal also enables the counter E3 which counts down from a relatively high frequency clock signal KT (KICK TIME) to terminate this pulse by closing the NAND gate D8. The KT time base is obtained from the Zilog CTC programmable time base chip and, in the preferred embodiment, has a period of 6.4 microseconds. The counter E3 divides this down by a factor of 8. At the end of the 8 counts, the TC output from the counter E3 terminates the KICK pulse by driving low one input to the NAND gate D8 and, at the same time, terminates the counting operation of the counter E3 by pulling low the enable or CP terminal thereof. The KICK pulse thus has a duration of about 50 microseconds. This counter E3 is then reset to zero when the TC output signal from the counter E4 goes low at the next transition in the 1 MIL timing signal.

The vertical or line-feed control circuitry comprising counters E5 and E6 is essentially identical to the circuitry which drives the slew control stepping motor 23 except that the time base or step signal is derived directly from the command latch E1, rather than being scaled down from a timing signal such as the 1 MIL signal which drives the pre-scaler E4 for the slew control. Thus, vertical feed is always under programmatic control. While the preset input to all of the counters are shown as grounded so that presetting is to an all zero state, it may in some instances be desirable to have the counters E2 and E5 reset to a state corresponding to the existing state of energization of the respective stepping motor. In this case, the preset inputs can be derived from the ROM output signals.

In decoding a character in accordance with the stored font information to form a bit map, the microprocessor controller indicates each pin firing by outputing a single bit. The resolution of the bit map in the horizontal direction is 1 mil of lateral movement or 90 microseconds in the time separation while the head is moving at its full normal slew speed. As will be seen, this resolution corresponds to the period of the bit map timing signal. Thus, successive possible positions for a pin strike in the horizontal direction are separated by only 1 mil though repeated strikes of a single pin can be ordered only at 8 mil intervals as explained previously. Likewise, it will be understood that the pin mechanism itself will not respond in a period as short as 90 microseconds nor is a pulse width of 90 microseconds appropriate for energizing such a device. In accordance with one aspect of the present invention, it has been found that optimal operation of the individual impact pins may be effected if the energization is controlled in accordance with an algorithm or waveform described in greater detail with reference to FIGS. 12a and 12b.

To effect a pin firing, the corresponding print head winding is energized for about 450 microseconds. This pulse initiates the pin strike and provides the energy for the printing impact. This energizing impulse is essentially complete before the pin actually strikes the ribbon and paper, the pin being at this moment essentially free-flying. After striking the paper, backed up by the platen 53, the pin rebounds with appreciable velocity which will produce an appreciable oscillation of the pin around its normal rest position if no further action is taken. If the pin is to be reactuated as soon as possible, a second energizing pulse of 450 microseconds' duration is applied 270 microseconds after the first pulse. In effect, successive pulses both stop the rebound from the previous strike and reinitiate the forward motion of the pin in its next forward oscillation to again strike the ribbon and paper. If, however, it is not intended that the pin be again actuated, there is a substantial danger that the undamped oscillation of the pin may be sufficiently large to cause the pin to strike the paper and create an unwanted impression, though the impression may be substantially lighter than that caused by an intended strike.

To prevent this unwanted restrike, the circuitry of FIG. 9 detects the fact that a given energizing impulse is not to be followed by another intended strike and then generates a short pulse which is timed to occur during the rebound of the pin and which by opposing the rebound velocity, tends to damp and stop the motion of the pin. Briefly stated in words, the algorithm followed is as follows. Successive pin strikes at minimum separation are effected by 450 microsecond pulses separated by 270 microsecond periods of de-energization. If, after a given energizing pulse, no following such pulse is called for in the next 900 microseconds, a 180 microsecond damping pulse is generated 270 microseconds after the last energizing pulse. The damping pulse width is selected to essentially stop the rearward motion of the pin without imparting a new forward motion. As will be understood, the pulse widths and overall waveform characteristics will vary with the particular print head used.

Figure 12A:
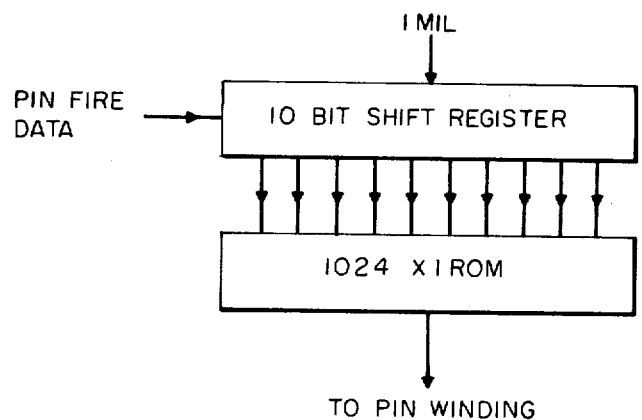
FIG. 12a is a simplified implementation of the system employed for generating a desired pin energizing waveform.
Figure 12B:
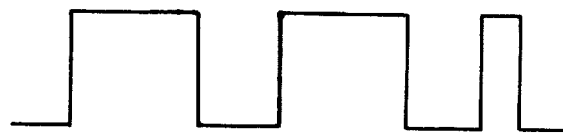
FIG. 12b is an illustration of the waveform generated.

To generate this algorithm with its look-ahead aspect, the pin fire signal for each pin is, in effect, entered into a 10 bit shift register which is then stepped by the 1 mil clock. The 10 outputs from the shift register are then employed to address a read-only memory and the read-only memory generates an output which indicates whether the pin winding should be energized or not for that 90 microsecond interval. A simplified illustration of this concept is shown in FIG. 12a while a representative waveform occurring after the last scheduled impact pin strike in a sequence is shown in FIG. 12b. In the actual implementation employed in the preferred embodiment illustrated, however, the need for a separate read-only memory for each pin position was obviated by time multiplexing the use of the read-only memory and by implementing the several shift registers using randon access memory components and latches.

With reference to FIG. 9, circuitry shown there was devised utilizing available integrated circuit components. Three 16×4 RAM chips IC 5, IC 6 and IC 7 and two 6-bit latch circuits IC 8 and IC 9 are interconnected to form eight shift registers each of which is 12 bits long. It may be noted that the memory capacity would allow for sixteen such shift registers but only eight are utilized, the most significant address bit of each memory being permanently grounded. Likewise, the eighth shift register is essentially a space since the print head presently employed provides only seven pins. Likewise, the last 2 bits of each shift register are unused in this particular embodiment. The memories are periodically cycled to present the successive shift register contents by a counter IC 1. A full cycle takes place at each transition of the 1 MIL signal, the counter IC 1 being driven through its cycle by a 2.5 MHz clock signal so that the multiplexing occurs in a time which is short relative to the printer operation.

The parallel input-output interface circuitry 111 presents the pin firing data for each 1 mil increment of head travel as an 8-bit parallel word. This word appears on the data lines F$\phi$–F7 which also are employed in loading the command latch E1 described previously. This parallel data is entered into a parallel-input serial-output shift register IC 2 which is clocked at a 2.5 MegaHertz rate to, in effect, serialize the data for entry successively into the 1st bit positions of the 8 shift registers as they are successively addressed by the counter IC 1. For this purpose, the serial-output signal from the shift register IC 2 is applied to the first input of the RAM IC 5. The most significant bit from the counter IC 1 is used to control the read/write (R/W) operation of the memories IC 5–7 so that updating of the information in the shift registers occurs on one transition of the 1 MIL signal and reading out occurs on the other. Synchronous operation is provided by combining this signal with the high frequency clock in NAND gate IC 11.

Again, to make use of available components, the read-only memory IC 10 is configured as a 256×4 bit device. As the parallel contents of each shift register is entered into the latching circuits, the first 8 bits are employed to address the ROM IC 10 and the next 2 bits address a demultiplexer IC 11 which selects one of the 4 bits outputted by ROM IC 10. The selected data bit is designated the FIRE signal. The FIRE signal constitutes serially multiplexed data defining the desired states of the several pins and this data is entered into an addressable latch which is addressed by the same counter IC 1 which cycles the random-access memories IC 5, IC 6, and IC 7. The latch IC 4, in effect, reconstitutes the data in parallel format and the output leads from the latch are employed to control the pin driving amplifiers which energize the head windings.

The operations of this part of the circuitry is thus as follows. At the start of each bit map timing signal, the 8 data bits representing the pin fire data are serialized and entered into the 1st bit positions of the respective shift registers. At the same time, as the parallel contents of each of the shift registers are successively run through the latches IC 8 and IC 9, the algorithm contained in the read-only memory IC 10 generates the pin firing information for the several pins according to the algorithm described earlier. This serially generated data is converted to parallel form in the latch IC 4 and used to control the energization of the pin windings. It should be understood that this 8-step cycle is performed once at the start of each bit map interval and the eight steps occur at the 2.5 Megacycle rate so that the slight skewing in time which may occur in the energization of the different pins is imperceptible as compared with the nominal bit map timing signal period of 90 microseconds.

As will be understood, the pulse widths and overall waveform resulting from the algorithm described were chosen for one particular set of head characteristics and waveforms of different shape and energy content may be appropriate for print heads of other designs. An advantage of the particular implementation shown in that the algorithm can be readily changed by merely substituting a different read-only memory with appropriately stored data.

The program performed by the microprocessor controller is believed best explained by describing the data structure manipulated by the processor, rather than by a detailed recording of the machine language code stored in the read-only memory 109. Firstly, it is appropriate to consider the format in which the font data is stored. This is represented graphically in FIG. 13. As indicated previously, the data defining the several fonts which may be utilized is stored in the read-only memory 129.

Figure 13:
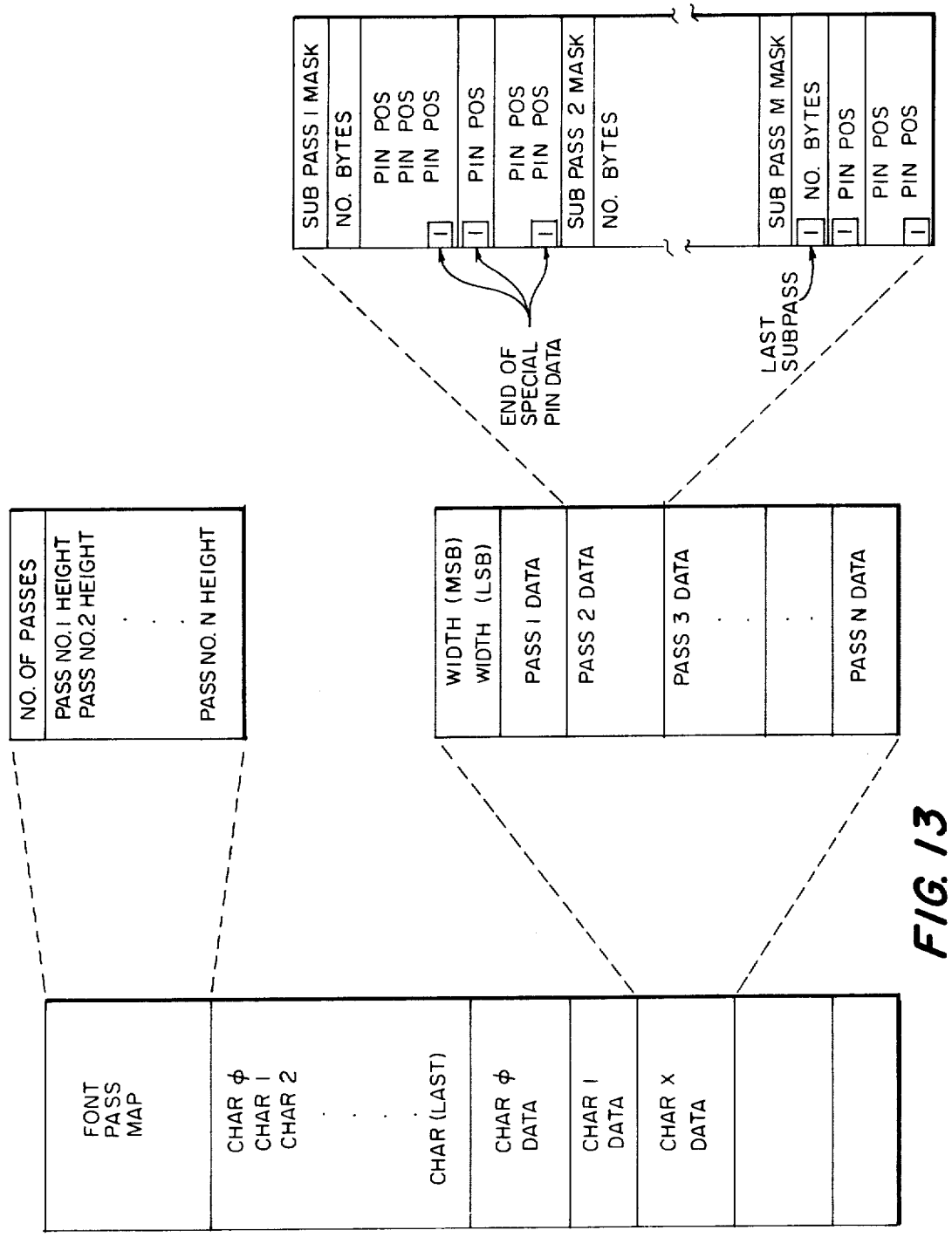
FIG. 13 is a chart representing a data format employed in storing font information according to the practice of the present invention.

With reference to FIG. 13, the first portion of each font comprises a Font Pass Map which defines what passes are utilized in printing the characters of that font. This involves both defining the number of passes to be made and the heights of each pass relative to an arbitrary base line. The font of FIG. 10, for example, was devised employing four passes. As indicated previously, the stepping motor 71 can position the paper vertically with a resolution of 3½ mils but the advance between successive passes may be in multiples of this 3½ mil increment in order to facilitate the shaping of the characters.

Following the Font Pass Map are a succession of pointers, one for each character in the font. These pointers indicate the starting addresses of the blocks of data which actually define the several characters. These individual blocks of data follow the pointers. As the blocks of character-defining data may be of arbitrary length, the pointers are used as a means of indirect addressing to efficiently utilize memory space.

The data defining each character in turn comprises a pair of bytes which indicate the width of the character, i.e. which define the right hand most and left hand most bit positions utilized in forming the character. This information is useful in conjunction with various word processing systems with which the printer may be used which can achieve margin justification by adjusting the spaces between characters. The bytes defining the width of the character are followed by blocks of data which define the dot positions to be filled on the successive passes or traverses of the head.

As also indicated in FIG. 13, the data corresponding to each pass comprises, firstly, a byte defining a mask for that pass. As explained hereinafter, the mask indicates which pins will be utilized during that pass in forming the particular character. The next byte in this block of data is a value indicating the number of bytes which follow and which pertain to that pass. In general, the number of bytes is equal to the number of pin strikes occurring in that pass for that character. Successive bytes for this block of data indicate pin firing positions, the information for the first pin being given first.

Figure 14:
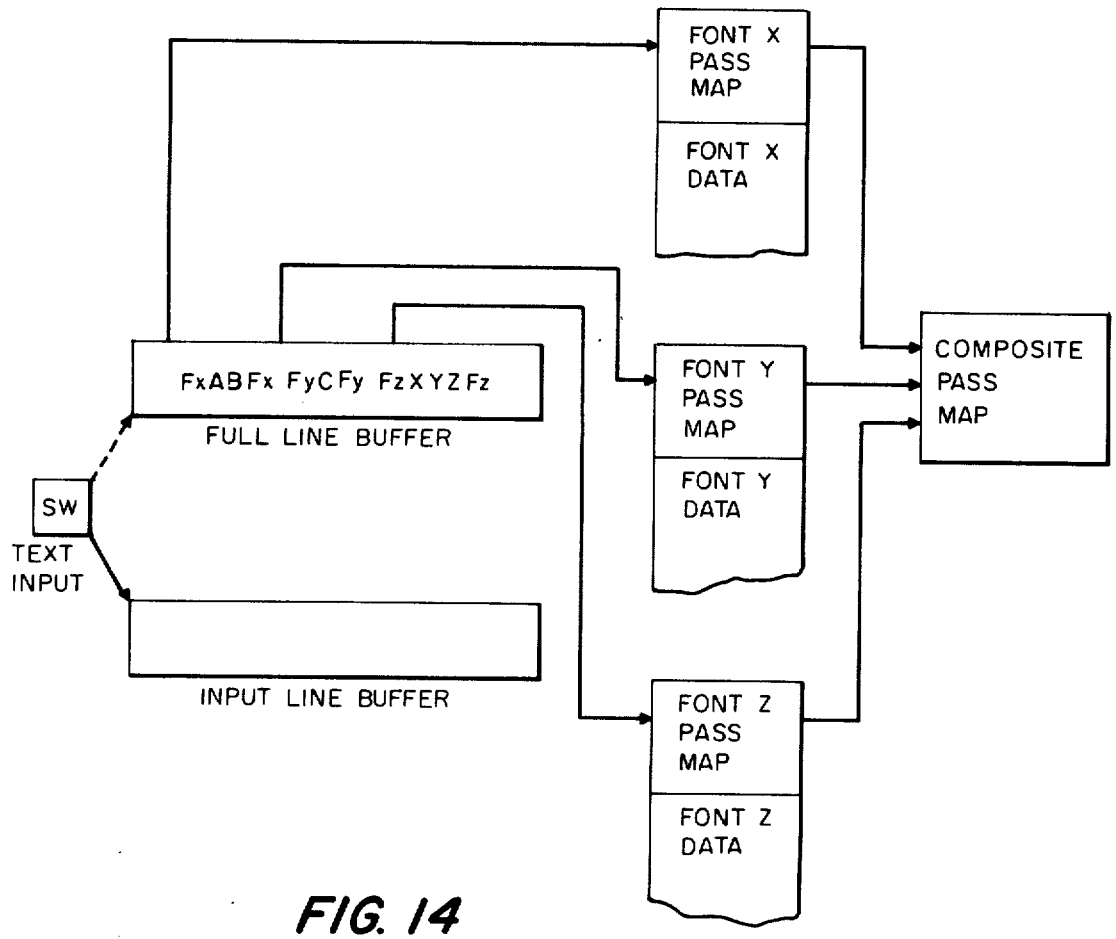
FIG. 14 is a flow chart illustrating how encoded alphanumeric data is sorted to generate a composite pass map employed in controlling sequential successive traverses of the print head of the present invention.

In utilizing this data format in generating a detailed bit map from a fully encoded input data stream, e.g. in ASCII code, the microprocessor system first generates a Composite Pass Map. The procedure utilized for doing this is illustrated in FIG. 14. The input data stream is used to load a first full line buffer while a second full line buffer is being decoded. It should be understood that these buffers are in fact allocated sections of the working RAM memory 107 shown in FIG. 4.

The text in a filled line buffer is first scanned to detect codes designating font selections. These codes are indicated in FIG. 14 by $F_x$, $F_y$, and $F_z$ as distinguished from the characters themselves, e.g. A, B, C, X, Y, Z. From the Font Pass Map portion of the data defining each font, a Composite Pass Map is generated which indicates all the passes which will have to be made to generate all the fonts which appear on that line. This procedure allows lines to be formed which have mixed fonts by scheduling sufficient passes to print all the fonts utilized, while avoiding any unnecessary passes.

Figure 15:
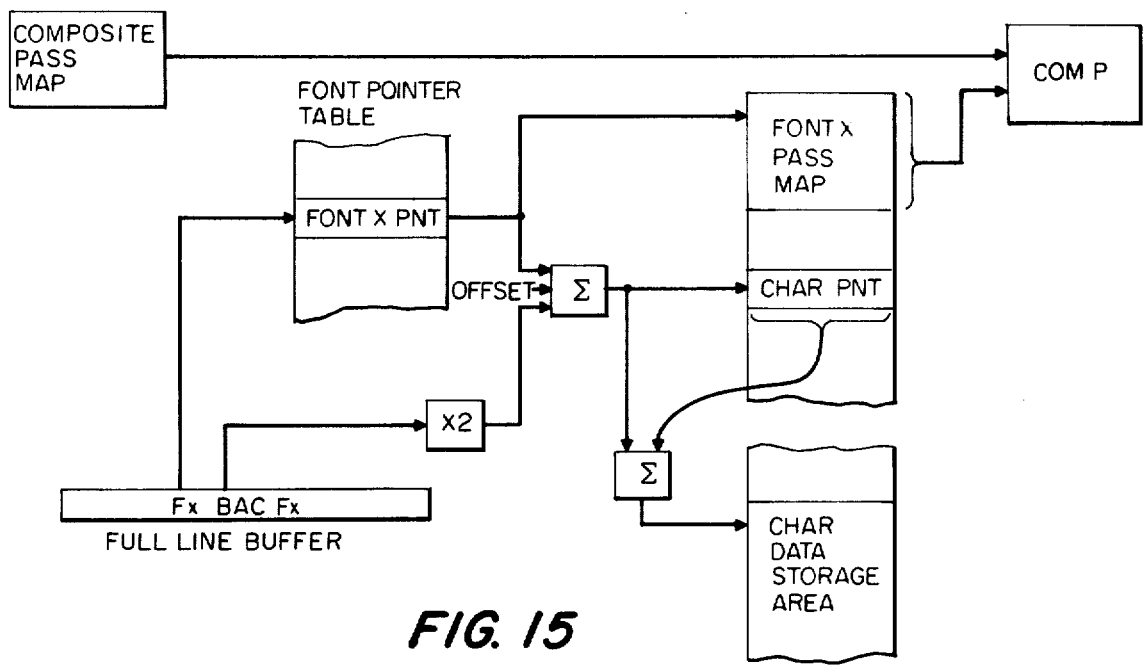
FIG. 15 is a flow chart representing manipulation of the encoded data to locate font information.

Having constructed the Composite Pass Map, the processor can direct the print head to start executing the passes defined in that map. As the head is making each of these passes at the respective height, the processor again scans the line buffer, in effect running ahead of the head, to decode each character encountered. This process is illustrated in FIG. 15. The decoding is done considering not only the character definition, e.g. according to the ASCII code, but also the font designation code which last preceded that character. As indicated previously, the font designation can direct the microprocessor, by means of a font pointer table stored in the read-only memory 109, to the appropriate portion of the read-only memory 129 where the font data is enclosed. From the Font Pass Map thereby located, the processor determines whether the current pass is utilized in printing the selected font. Assuming that the pass is utilized, the processor then locates the character pointer for each of the following ASCII coded characters in the full line buffer. A form of relative addressing is utilized in which the ASCII value for each character is doubled and added to the value of the font pointer together with a fixed offset which allows for the memory space occupied by the Font Pass Map. The character pointer is likewise encoded on a relative addressing basis so that a further summing yields the address for the character data storage area.

Figure 16:
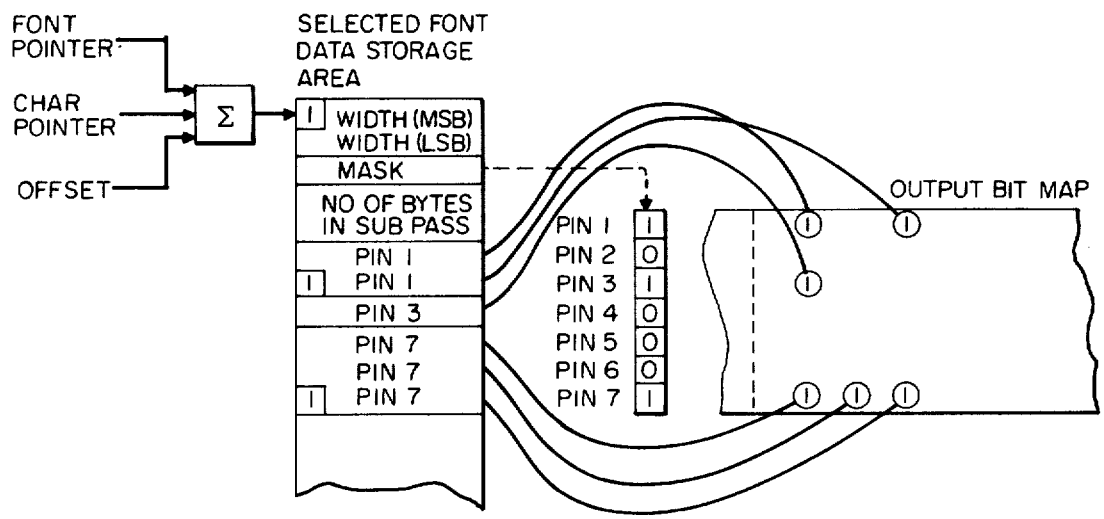
FIG. 16 is a chart illustrating the decoding of font character information to obtain a bit map employed by the printer to generate individual pin strikes during each traverse of the print head.
Figure 17:
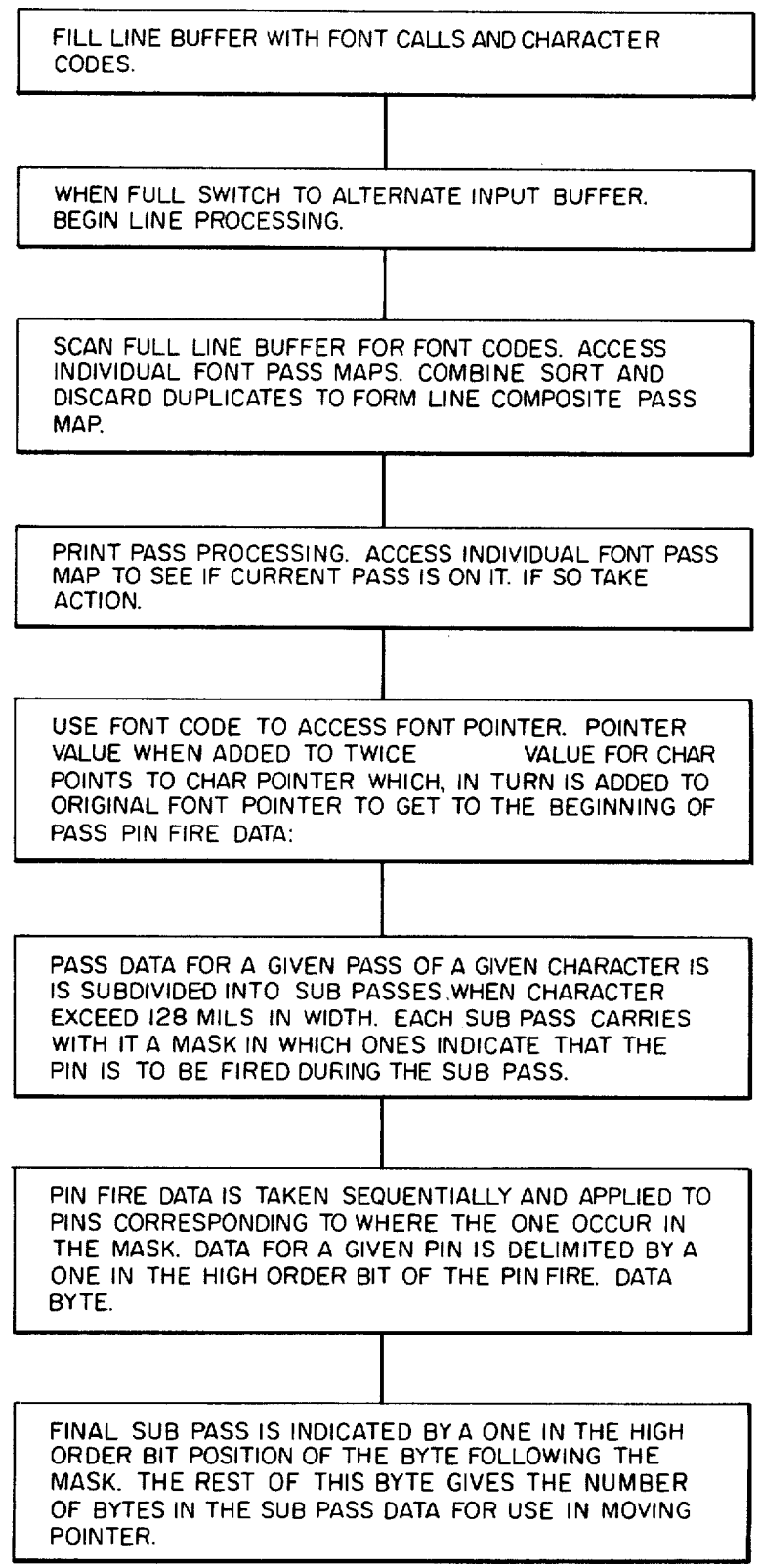
FIG. 17 is a flow chart representing the overall operation of the microprocessor controller in converting encoded data to a bit map suitable for generating high quality characters in accordance with the practice of the present invention.

The final formation of the bit map for a given pass is illustrated in FIG. 16. As indicated, the font pointer and a fixed offset are combined to obtain the address of the selected character in the selected font data storage area. As illustrated in FIG. 16, the mask, i.e. the third byte in the block of data, merely indicates which pins will be fired on this pass so that subsequent bytes indicating pin firings can be properly interpreted. Similarly, the next byte indicates how many bytes are employed in defining the character so that it can be determined when the end of the character has been reached. The successive bytes then indicate the locations of the pin firings, i.e. to the right of the given arbitrary reference line. As will be understood, approximately 128, e.g. $2^7$, such positions are possible. The most significant bit position in each byte is employed to indicate the end of data for each pin. Thus, in FIG. 16, the first pin is fired twice, the particular positions being determined by the values in the first two bytes of data, the third pin is caused to fire once at a position located by the following single byte, and pin 7 is caused to fire three times, these locations again being in correspondence with the binary values in the three data words. This program of data manipulation is summarized in the chart of FIG. 17 which may be considered to be a flow chart of the program of data manipulation.

As indicated previously, the detailed bit map so constructed is entered into memory in a portion thereof which is operated as a circular file. This data is then fed out to the printer through the parallel input/output device 111 utilizing the direct memory access capabilities of the system. As indicated previously, the direct memory accesses are initiated under the control of the one mil timing signal which determines the horizontal resolution of the system in conjunction with the dot position encoding scheme just described so that individual dots can be positioned laterally with a resolution which is an order of magnitude finer than the size of the dot itself.

From the foregoing, it can be seen that the system thus far described offers to the microprocessor controller the capability of traversing the print head 11 across the width of a sheet of paper to be printed and, as the head traverses, provides the ability to specify the point at which a pin strikes the paper to a lateral resolution of 1 mil. As explained previously, resolution at this level provides a capability which permits essentially arbitrary positioning so that a dot or pel can be positioned to constitute a best fit in creating a curved or slanted line segment. This lateral resolution allows the formation of truly high quality characters even when coupled with coarser vertical resolution obtained by means of interlacing scans. By interlaced scans is meant the operation whereby, between horizontal scans, the paper is advanced vertically an amount which is a submultiple of the vertical spacing between pins. In the embodiment being described, the preferred submultiple is one-quarter, i.e. the paper is advanced one-quarter of the nominal vertical separation between adjacent pins. In the Practical Automation print head identified, the vertical separation on centers between adjacent pins is 14 mils and the paper advancement between traverses is thus 3½ mils. After four traverses have been made, the paper is then advanced to bring up the next line to be typed.

It is preferred, in order to maximize printing speed, that the head print while travelling in both directions. Thus, for four-pass printing, the head will go back and forth twice for each line of characters to be formed. As will be appreciated by those skilled in the art, the decoding of the alphanumeric data which defines the characters to be printed in each line will thus occur in reverse order when travelling on the reverse stroke; the bit map font information will likewise be extracted in mirror-image form; and the microprocessor controller must make an opposite compensation for the pin drop delay which occurs between the reading out of a bit indicating a pin firing and the actual time of impact of the pin with the paper. These features, however, are well within the capabilities of the present microprocessor art and are accommodated in a program which is stored in the read-only memory 129.

For the purpose of the printed patent, it is believed that the general functioning of the program and its implementation is adequately disclosed by the charts of FIGS. 13-17, and that the implementation of an actual program listing from these charts will be apparent to those skilled in the art and familiar with the programming principles applicable to the Zilog Z80 Microprocessor Systems.

Likewise, in understanding the specification and claims, it should be understood that particular dimensions and component identification have been given by way of example and various equivalents will be easily apparent to those skilled in the art. For example, characters of normal type sizes might readily be constructed using dots from 5-15 mils in diameter and vertical interlacings in increments of 3-7 mils may produce quite acceptable character definition when employing horizontal resolutions which are in the order of 1 mil in accordance with the practice of the present invention.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Apparatus for impact printing on paper high quality alphanumeric characters from coded data using a printing means capable of producing dots of predetermined nominal diameter approximating ten mils;
    means for generating a bit map timing signal having a period which is preselectable;
    means responsive to said bit map timing signal for traversing said printing means across the width of a printing media in reversing passes at a speed such that the increment of head travel corresponding to the period of the bit map timing signal is essentially an order of magnitude smaller than the nominal dot diameter and about one mil;
    means for advancing the paper between successive passes in increments which are substantially larger than said increment but are substantially smaller than the nominal dot diameter so that vertically overlapping dots may be printed on successive reversing passes;
    means controlled by said bit map timing signal and operable during a traverse of said head for energizing said printing means in accordance with a stored bit map representing portions of characters to be printed on the current traverse, the lateral resolution of the bit map corresponding to the period of the bit map timing signal, the minimum distance between repeated operations of said print means being a multiple of said increment but less than said nominal dot diameter, whereby characters may be printed on successive traverses of the print head during which interlaced dot strings are printed with a horizontal resolution which is essentially an order of magnitude finer than the nominal dot diameter.

2. Apparatus for impact printing on paper high quality alphanumeric characters from coded data using a print head having a plurality of print pins at different heights, each of said pins being selectively energizable to produce a dot of predetermined nominal diameter;
    means for generating a bit map timing signal having a period which is preselectable;
    means responsive to said bit map timing signal for traversing said head across the paper at a speed such that the increment of head travel corresponding to the period of the bit map timing signal is essentially an order of magnitude smaller than the nominal dot diameter;
    means for advancing said paper vertically in increments which are a submultiple of the difference in height between successive vertically separated pin locations;
    means controlled by said bit map timing signal and operable during a traverse of said head for energizing said pins in accordance with a stored bit map representing portions of characters to be printed on the current traverse, the lateral resolution of the bit map corresponding to the period of the bit map timing signal,
    whereby characters may be printed on successive traverses of the print head during which interlaced dot strings are printed with a horizontal resolution which is essentially an order of magnitude finer than the nominal dot diameter.

3. Apparatus as set forth in claim 2 wherein the dot nominal diameter is about 10 mils and the increment of head travel corresponding to the period of the bit map timing signal is about 1 mil.

4. Apparatus as set forth in claim 3 wherein the increments of vertical paper advance are about 3 mils.

5. Apparatus as set forth in claim 2 wherein the speed of traversing the head is such that repetitive operations of an individual pin can produce overlapping dots at spacings which are multiples of the increment of head travel corresponding to the period of the bit map timing signal.

6. Apparatus as set forth in claim 2 wherein said traversing means includes a stepping motor, means for generating signals of overlapping phase for energizing said stepping motor and a pre-scaling counter driven by said bit map timing signal whereby the increments of travel corresponding to the period of said bit map timing signal are submultiples of the increment of travel produced by a single step of the stepping motor.

7. The method of impact printing high quality alphanumeric characters on paper from coded data using a print head having a plurality of impact print pins at different heights, each of said pins being operable to produce a dot of predetermined nominal diameter, said method comprising:
    traversing the head across the width of the paper at a preselected speed such that any single pin can be repetitively operated at predetermined intervals to produce overlapping dots;
    generating a bit timing signal having a period which corresponds to an increment of travel of the print head, which increment is essentially an order of magnitude smaller than the nominal dot diameter;
    advancing said paper vertically a distance which is a submultiple of the difference in heights between successive vertically separated pin locations and then traversing the head in the opposite direction;

decoding said data in accordance with stored information representing a character font thereby to obtain, for each traverse of the head, those portions of a character defining bit map which correspond to the lateral paths of the pins on the current traverse and storing said bit map portions, the lateral resolution of the bit map corresponding to the bit timing signal period;

and, during each traverse, obtaining from storage, in synchronism with said bit timing signal, those portions of the bit map corresponding to the lateral paths of the pins on the current traverse and operating the pins in accordance with that bit map information, whereby characters are printed on successive reversing traverses of the print head, during which interlaced dot strings are printed with a horizontal resolution which is essentially an order of magnitude finer than the nominal dot diameter.

8. The method of impact printing on paper high quality alphanumeric characters from coded data using a print head having a plurality of impact print pins at different heights, said method comprising:

traversing the head across the width of the paper at a preselected speed such that any single pin can be repetitively operated at predetermined intervals to produce overlapping dots;

generating a bit timing signal having a period which is a submultiple of the predetermined interval related to the repetitive operation of each pin;

advancing said paper vertically a distance which is a submultiple of the difference in heights between successive vertically separated pin locations and then traversing the head in the opposite direction;

decoding said data in accordance with stored information representing a character font thereby to obtain, for each traverse of the head, those portions of a character defining bit map which correspond to the lateral paths of the pins on the current traverse and storing said bit map portions, the lateral resolution of the bit map corresponding to the bit timing signal period;

and, during each traverse, obtaining from storage, in synchronism with said bit timing signal, those portions of the bit map corresponding to the lateral paths of the pins on the current traverse and operating the pins in accordance with that bit map information, whereby characters are printed on successive reversing traverses of the print head, during which interlaced dot strings are printed.

9. Apparatus for impact printing on paper high quality alphanumeric characters from coded data using a print head having a plurality of print pins at different heights, each of said pins being selectively energizable to produce a dot of predetermined nominal diameter;

means for generating a bit map timing signal having a period which is preselectable;

means responsive to said bit map timing signal for traversing said head across the paper at a speed such that the increment of head travel corresponding to the period of the bit map timing signal is essentially an order of magnitude smaller than the nominal dot diameter; means controlled by said bit map timing signal and operable during a traverse of said head for energizing said pins in accordance with a stored bit map representing portions of characters to be printed on the current traverse, the lateral resolution of the bit map corresponding to the period of the bit map timing signal, the speed of traverse of said head being such that the minimum distance between repeated operations of any single pin is a multiple of said increment of head travel;

means for advancing said paper vertically in increments which are a submultiple of the difference in height between successive vertically separated pin locations, whereby characters may be printed on successive traverses of the print head during which interlaced dot strings are printed with a horizontal resolution which is essentially an order of magnitude finer than the nominal dot diameter.

* * * * *